United States Patent
Das

(10) Patent No.: US 12,450,308 B2
(45) Date of Patent: *Oct. 21, 2025

(54) SET OPERATIONS USING MULTI-CORE PROCESSING UNIT

(71) Applicant: Microsoft Technology Licensing, LLC, Redmond, WA (US)

(72) Inventor: Ritwik Das, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,678

(22) Filed: Feb. 22, 2024

(65) Prior Publication Data

US 2024/0193229 A1    Jun. 13, 2024

Related U.S. Application Data

(63) Continuation of application No. 17/958,000, filed on Sep. 30, 2022, now Pat. No. 11,941,078, which is a continuation of application No. 16/848,395, filed on Apr. 14, 2020, now Pat. No. 11,494,463.

(51) Int. Cl.
   *G06F 17/16*    (2006.01)
(52) U.S. Cl.
   CPC .................... *G06F 17/16* (2013.01)
(58) Field of Classification Search
   CPC ........................ G06F 17/16; G06F 17/2237
   USPC ........................................... 708/607
   See application file for complete search history.

(56) References Cited

U.S. PATENT DOCUMENTS 11,494,463 B2 *  11/2022  Das ..................... G06F 16/2237
11,941,078 B2 *   3/2024  Das ..................... G06F 16/2237

FOREIGN PATENT DOCUMENTS

KR      20240056771 A  *  4/2024

OTHER PUBLICATIONS

Examination Report Received in Indian Patent Application No. 202217057399, mailed on Jun. 3, 2025, 08 pages.
Communication pursuant to Article 94(3) EPC Received for European Application No. 21710793.7, mailed on Jul. 1, 2025, 11 pages.
First Office Action Received for Chinese Application No. 202180028120.0, mailed on Jul. 7, 2025, 19 Pages (English Translation Provided).

* cited by examiner

*Primary Examiner* — Tan V Mai
(74) *Attorney, Agent, or Firm* — Workman Nydegger

(57) ABSTRACT

Performing set operations using sparse matrix operations offered by a multi-core processing unit (such as a graphics processing unit). The set operation is converted into operand matrices, and sparse matrix operations, foregoing the use of hash tables. The input set is converted into a matrix, a matrix operation corresponding to the set operation is identified, and one or more operands of the set operation are also represented within a matrix. The matrix operation is then performed on these matrices to obtain an output matrix, which is then converted to an output set.

20 Claims, 3 Drawing Sheets

SET OPERATIONS USING MULTI-CORE PROCESSING UNIT

CROSS-REFERENCE TO RELATED APPLICATIONS

This application is a continuation of U.S. patent application Ser. No. 17/958,000 filed on Sep. 30, 2022, entitled "SET OPERATIONS USING MULTI-CORE PROCESSING UNIT," which is a continuation of U.S. patent application Ser. No. 16/848,395 filed on Apr. 14, 2020, entitled "SET OPERATIONS USING MULTI-CORE PROCESSING UNIT," which issued as U.S. Pat. No. 11,494,463 on Nov. 8, 2022, and which applications are expressly incorporated herein by reference in their entirety.

BACKGROUND

A processing unit can have several cores that are each able to perform tasks in parallel with each other. Conventional Central Processing Units (or CPUs) have several complex cores that can each perform complex tasks. On the other hand, Graphics Processing Units (GPUs) have a comparatively larger number of comparatively smaller cores. Thus, GPUs are helpful in performing larger quantities of simpler tasks with very high degrees of parallelism and efficiency.

GPU manufacturers typically offer a GPU library of functions that the GPU manufacturer anticipates would be useful to be performed by the GPU. Such functions include matrix operations. Accordingly, GPU libraries typically offer matrix operation functions that can be performed on one-dimensional or two-dimensional matrices. Such matrix operations include operations for sparse matrices (matrices that are mostly populated within zeros) as well as dense matrices (matrices that are mostly populated with non-zero values). However, GPU libraries do not include set operations.

A set is a collection (whether ordered or unordered) of data items that supports two primary operations: insertion and query (or lookup). Each data item could be any data item, such as a single value, or a key-value pair. One way to implement sets and set operations on a graphics processing unit is to represent the set in a hash table. The industry standard hash-table implementations on the GPU provides slightly different variations of the bounded hash-table (Basic/Compacting/Multi-value) but all of these variants have one thing in common—fixed size (32-bit) keys and values. This limits the domain of elements that can be stored in a single hash-table to approximately $2^{32}$ (or about 4 billion). The primary factor which is responsible for such a limit is the comparatively smaller device memory size. This restriction makes the development of highly parallel GPU algorithms especially for large data volumes challenging. Also the presence of hashing adds significant overhead to the insertion/retrieval logic of hash-sets.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to performing set operations using sparse matrix operations offered by a multi-core processing unit (such as a graphics processing unit). Furthermore, the set operations are performed without using a hash table to store a set, and without using hash operations in order to perform set operations (such as insert and query) on that hash table. Doing such hash operations would typically require a lock to be placed on the hash table, thereby funneling through a limited set of hash operations at a time.

Accordingly, by converting set operations to sparse matrix operations, and foregoing the use of hash tables, set operations can be performed with high degrees of parallelism, and thus very efficiently and quickly. As an example, many elements may be added to an extremely large set, or many elements may be queried from a large set using a single and quick operation. Furthermore, since set operations are converted to sparse matrix operations, such set operations can be performed by the multi-core processing unit even though the multi-core processing unit does not offer set operations in its library. Accordingly, the principles described herein further unlock the potential of a multi-core processing unit to efficiently and quickly perform set operation.

In accordance with the principles described herein, an input set is represented as a first matrix collection that includes at least a first matrix having a bit value at each position that has an index of the same value of the input set. Then, a system identifies the set operation along with one or more operands that are to be performed using the set operation. These one or more operands are then represented in the form of a second matrix collection that includes a second matrix having bit values at each position that has an index of the same value as any of the one or more operands. A sparse matrix operation corresponding to the set operation is then identified. The multi-core processing unit then performs the sparse matrix operation using the first matrix collection and the second matrix collection to thereby obtain an output matrix. This output matrix is then converted to an output set that represents a result of performing the set operation upon the input set to produce an output set.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to performing set operations using sparse matrix operations offered by a multi-core processing unit (such as a graphics processing unit). Furthermore, the set operations are performed without using a hash table to store a set, and without using hash operations in order to perform set operations (such as insert and query) on that hash table. Doing such hash operations would typically require a lock to be placed on the hash table, thereby funneling through a limited set of hash operations at a time.

Accordingly, by converting set operations to sparse matrix operations, and foregoing the use of hash tables, set operations can be performed with high degrees of parallelism, and thus very efficiently and quickly. As an example, many elements may be added to an extremely large set, or many elements may be queried from a large set using a single and quick operation. Furthermore, since set operations are converted to sparse matrix operations, such set operations can be performed by the multi-core processing unit even though the multi-core processing unit does not offer set operations in its library. Accordingly, the principles described herein further unlock the potential of a multi-core processing unit to efficiently and quickly perform set operations.

In accordance with the principles described herein, an input set is represented as a first matrix collection that includes at least a first matrix having a bit value at each position that has an index of the same value of the input set. Then, a system identifies the set operation along with one or more operands that are to be performed on this input set. These one or more operands are then represented in the form of a second matrix collection that includes a second matrix having bit values at each position that has an index of the same value as any of the one or more operands. A sparse matrix operation corresponding to the set operation is then identified. The multi-core processing unit then performs the sparse matrix operation using the first matrix collection and the second matrix collection to thereby obtain an output matrix. This output matrix is then converted to an output set that represents a result of performing the set operation upon the input set to produce an output set.

Figure 1:
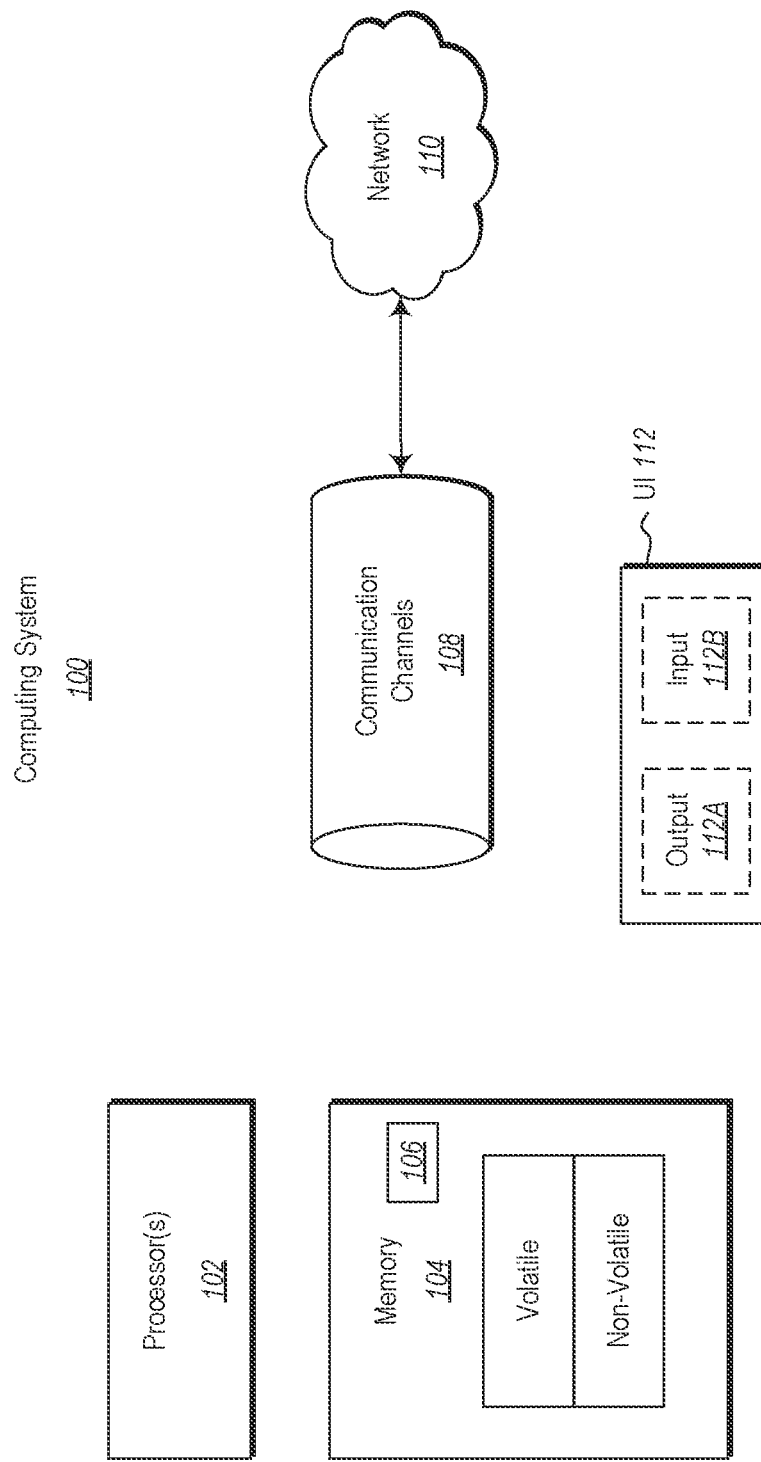
FIG. 1 illustrates an example computing system in which the principles described herein may be employed.

Because the principles described herein are performed in the context of a computing system, some introductory discussion of a computing system will be presented with reference to FIG. 1. Then, the use of matrix operations of a multi-core processing unit to perform set operations will be described with respect to FIGS. 2 and 3.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 includes at least one hardware processing unit 102 and memory 104. The processing unit 102 includes a general-purpose processor. Although not required, the processing unit 102 may also include a field programmable gate array (FPGA), an application specific integrated circuit (ASIC), or any other specialized circuit. In one embodiment, the memory 104 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Figure 2:
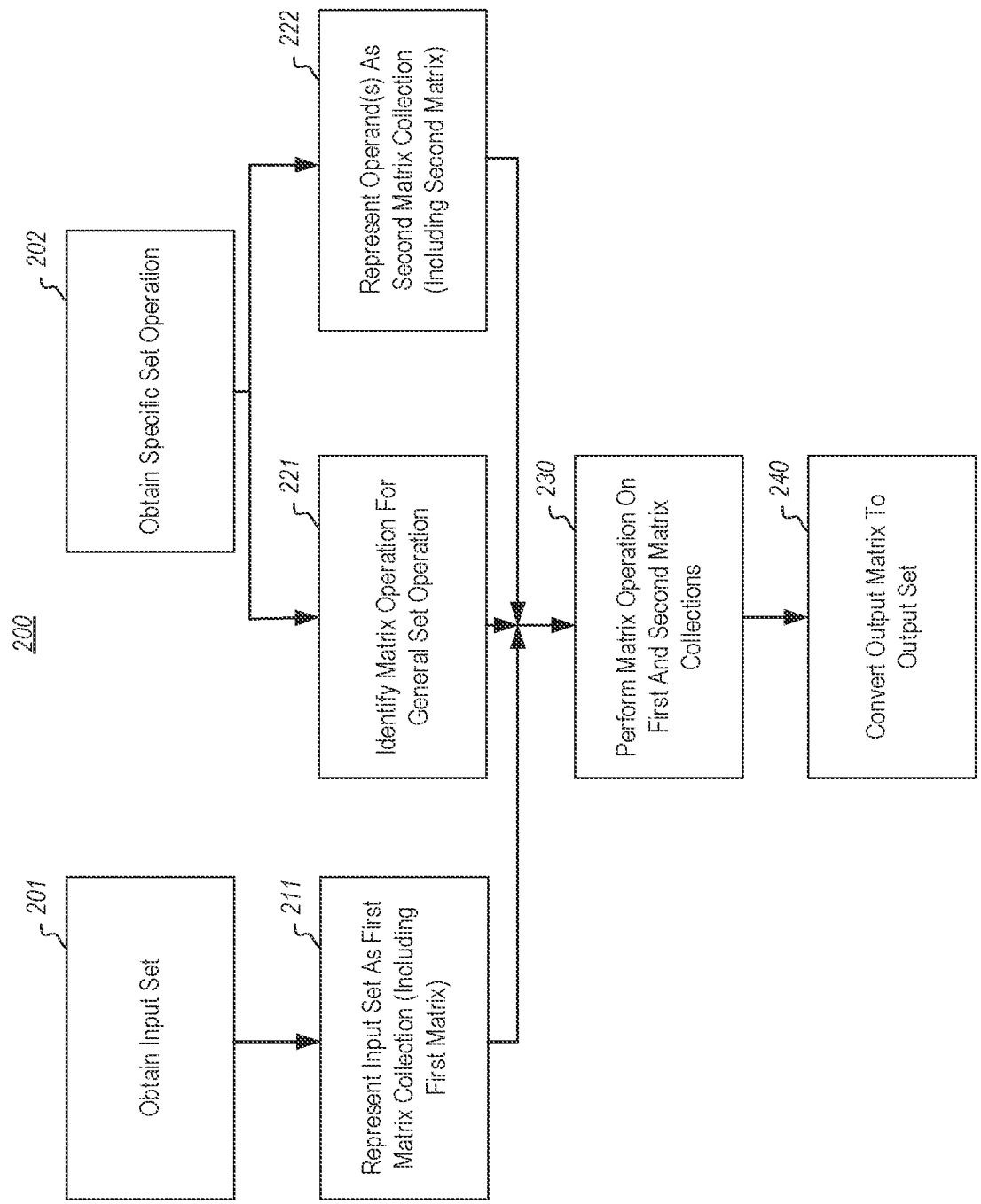
FIG. 2 illustrates a flowchart of a method for using a sparse matrix library of a multi-core processing unit to perform set operations, in accordance with the principles described herein.

FIG. 2 illustrates a flowchart of a method 200 for using a sparse matrix library of a multi-core processing unit to perform set operations, in accordance with the principle described herein. In one embodiment, the method 200 is performed by a computing system such as the computing system 100 of FIG. 1. As an example, a graphics processing unit performs the act 230 within the method 200, whereas another more general-purpose processing unit performs the remainder of the method 200. As an example, the acts 201, 202, 211, 221, 222 and 240 can be performed by a computing system, such as the computing system 100 of FIG. 1. In that case, these acts can be performed in response to the at least one hardware processing unit 102 (which could be a general-purpose processing unit that is distinct from the graphics processing unit that performs the act 230) executing one or more computer-executable instructions that are stored in the memory 104. Specifically, the computer-executable instructions are structured to cause the computing system 100 to perform the method 200 when executed by the at least one hardware processing unit 102.

Figure 3:
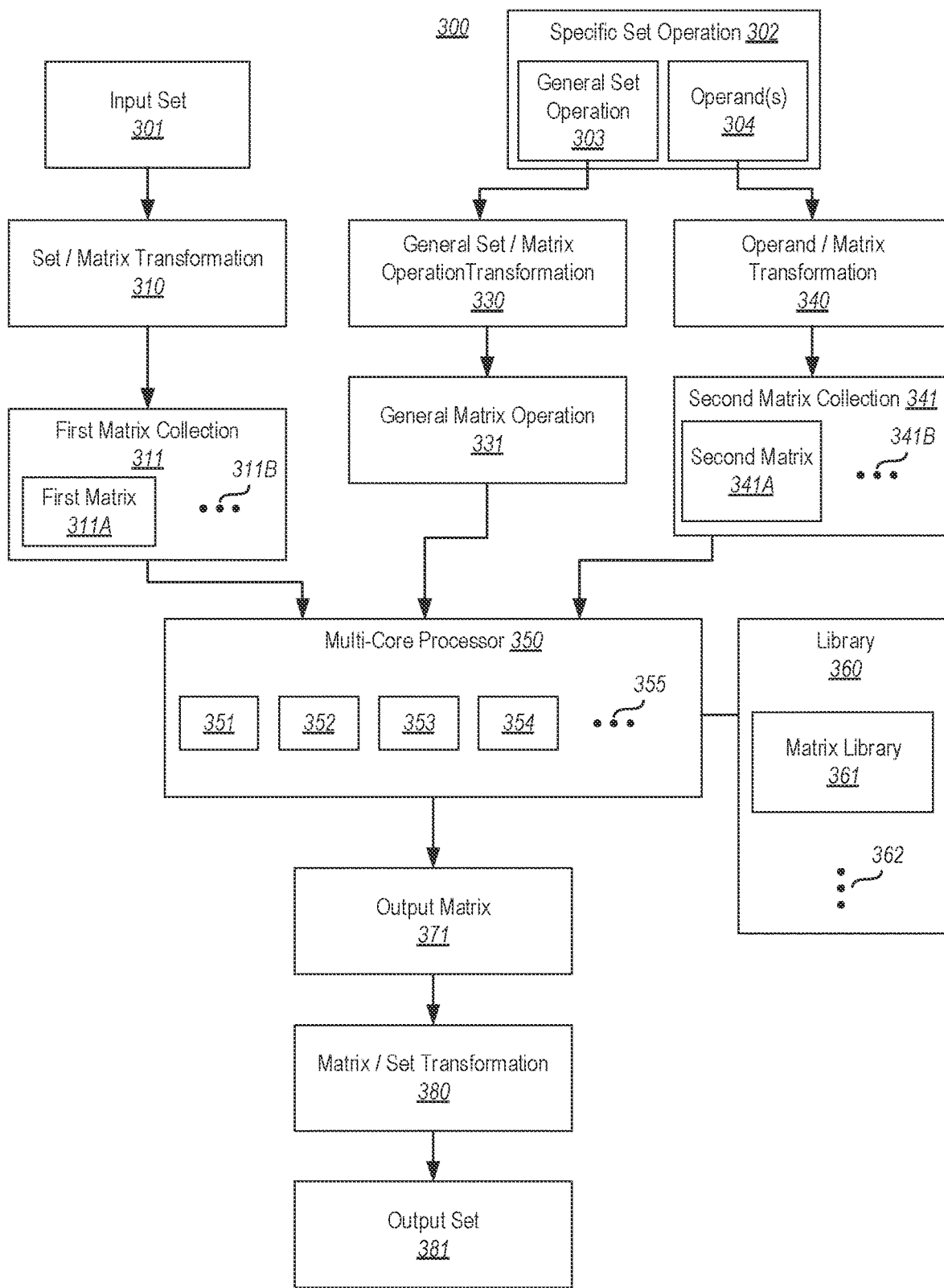
FIG. 3 illustrates a computing environment that includes a multi-core processing unit, and in which the method of FIG. 2 may be performed.

FIG. 3 illustrates a computing environment 300 that includes a multi-core processing unit 350. In the illustrated case, the multi-core processing unit has four cores 351 through 354. However, the ellipsis 355 represents that there may be many more cores of the multi-core processing unit 350. As an example, the multi-core processing unit 350 may be a graphics processing unit that includes hundreds or thousands of different cores, each capable of performing tasks in parallel.

The multi-core processing unit 350 includes a function library 360 that typically ships with the multi-core processing unit 350, and which programmers can draw from in order to operate the multi-core processing unit. As an example, a graphics processing unit typically has a matrix library (such as matrix library 361), amongst potentially other functions (as represented by the ellipsis 362). The matrix library of conventional graphics processing units typically include dense matrix functions, and sparse matrix functions. In addition, for each of the dense and sparse matrix categories, the matrix library has functions to operate on one-dimensional matrices as well as two dimensional matrices. Such matrices conventionally have domains of up to $2^{32}$ (or about four billion) in each dimension.

The environment 300 also includes a number of executable components that are each structured as described above for the executable component 106 of FIG. 1. For instance, the environment 300 includes set/matrix transformation component 310, a general set/matrix operation transformation component 330, an operand/matrix transformation component 340 and a matrix/set transformation component 380. As the method 200 of FIG. 2 can be performed in the environment 300 of FIG. 3, the method 200 of FIG. 2 will now be described with frequent reference to the environment 300 of FIG. 3.

Referring to FIG. 2, the method 200 includes obtaining an input set (act 201). In FIG. 3, this input set is represented as input set 301. It is this input set that will be subject to a specific set operation. In one simplified example referred to hereinafter as the "simple example", suppose that the input set is $\{1, 3\}$, which is a set having two elements, one of value 1 and one of value 3. This simple example is used for illustrative purposes only. The subject example is simple in several respects, that is the number of elements in the set is very low, and also the values of the elements are in a small range (i.e., from 1 to 3). An actual input set may be quite large and include any number of values. But for proper understanding, the principles will be described with respect to the subject example, with an explanation of how the principles can be extended to more complex examples.

Referring again to FIG. 2, the method 200 then includes representing the input set as a first matrix collection that includes at least a first matrix (act 211). In FIG. 3, the set/matrix transformation component 310 uses the input set 301 to generate a first matrix collection 311 that includes the first matrix 311A, as well as potentially other matrices as represented by the ellipsis 311B. In one example, each element within the input set is a value, in which case the first matrix collection 311 includes only the first matrix 311A. However, in another example discussed in further detail below, each element in the input set is a key-value pair. In that case, the first matrix collection 311 would include a first matrix for the keys, and another matrix for the corresponding values.

For now, assume that the input set includes only values as elements. Such is the case in the simple example in which the input set is $\{1, 3\}$. In this case, the first matrix collection 311 includes only the first matrix 311A. Specifically, the first matrix includes a bit value (e.g., a binary 1) at each position that has an index that is of the same value as an element of the input set, and otherwise has an opposite binary value (e.g., a binary 0). In our example, the values of the elements within the input set $\{1, 3\}$ fall within the range of 0 to 3. Accordingly, the input set $\{1, 3\}$ is transformed into a matrix [0 1 0 1].

Here, there is a binary 1 at the first position, which represents the first element (having value 1) in the input set $\{1, 3\}$. In the convention here, the leftmost element in a set is at the zero'th position. There is likewise a binary 1 at the third position, which represent the second element (value 3) in the input set $\{1, 3\}$. The value at the zero'th index position of the first matrix [0 1 0 1] is a binary 0 representing that there is no element of value 0 in the input set $\{1, 3\}$. Likewise, the value at the second index position of the first matrix [0 1 0 1] is also a binary 0 representing that there is no element of value 0 in the input set $\{1, 3\}$. Thus, in the simple example, the input set $\{1, 3\}$ is an example of the input set 301, and the first matrix [0 1 0 1] is an example of the corresponding first matrix 311A.

In this simple example, the first matrix is a one-dimensional matrix having only four elements. However, each matrix in the first matrix collection should be structured in a way that the multi-core processing unit accepts the matrix as input. For instance, if the multi-core processing unit is to perform a function on a one-dimensional sparse matrix of size $2^{32}$, then the first matrix would take the form of a sparse matrix having a binary one at index positions one and three, and a binary zero at all other locations.

A specific set operation is to be performed on the input set. Accordingly, the method 200 includes obtaining that specific set operation (act 202). Referring to FIG. 3, the specific set operation 302 is illustrated as including a general set operation 303 as well as one or more operands 304. As an example, the general set operation 303 could be insert or query. The operand(s) 304 identify what element is to be operated on in accordance with the general set operation. As an example, assume a specific set operation of "insert 2 into the set". This can be broken down into a general set operation of "insert" as well as an operand of "2".

Referring to FIG. 2, the matrix operation corresponding to the general set operation is identified (act 221). In addition, the operand(s) of the specific set operation are represented in a second matrix collection that includes a second matrix (act 222). For instance, in the environment 300, the general set operation 303 of the specific set operation 302 is provided to a general set/matrix operation transformation component 330 to generate a general matrix operation 331. This transformation may be a simple mapping of operations. For example, an insert set operation is mapped to a bit-wise logical OR sparse matrix operation. On the other hand, a query set operation is mapped to a bit-wise logical AND sparse matrix operation.

In addition, the identified operand(s) of the specific set operation are represented in a second matrix collection that includes a second matrix (act 222). In FIG. 3, for instance, the operand(s) 304 of the specific set operation 302 are provided to an operand/matrix transformation component 340, which generates a second matrix collection 341 that includes the second matrix 341A as well as potentially other matrices as represented by the ellipsis 341B. In the case in which the input set includes elements that are just values, the second matrix collection 341 includes only the second matrix 341A. If the input set included elements that were key-value pairs, then there could be cases (depending on the general matrix operation) in which there would be other matrices included within the second matrix collection 341 as well.

To illustrate, in the simple example in which the input set is {1, 3}, suppose that the specific set operation is to insert 2 into the set. Here, as previously mentioned, the general set operation is an insert set operation and the corresponding matrix operation is a bit-wise logical OR matrix operation. Furthermore, the second matrix is generated so as to have a bit value (e.g., a binary 1) at each position that has an index having a same value as any operand, and otherwise have the opposite bit value (e.g., a binary 0) at the other index positions of the second matrix. Thus, again, assuming a matrix having four index positions, zero, one, two, and three, the value at the second index position is set to a binary 1 (representing that the element having value 2 is to be operated upon—inserted in this case) and the values at the other index positions are each set to a logical zero. Thus, if 2 is to be inserted into the input set {1, 3}, the second matrix takes the form [0 0 1 0].

The matrix inputs are now ready for the multi-core processing unit. Accordingly, the multi-core processing unit performs the identified sparse matrix operation upon the first matrix collection and the second matrix collection to generate an output matrix (act 230). In FIG. 3, the first matrix collection 311 and the second matrix collection 341 are provided to the multi-core processing unit 350, which performs the general matrix operation 331 upon these two matrix collections 311 and 341, thereby resulting in an output matrix 371. In the simple example in which a 2 is to be inserted into the input set {1, 3}, the multi-core processing unit bit-wise logical OR's matrix [0 1 0 1] and matrix [0 0 1 0] to obtain output matrix [0 1 1 1].

Returning to FIG. 2, the output matrix is then converted to an output set (act 240) thereby completing the performance of the specific set operation on the input set. Referring to FIG. 3, the matrix/set transformation component 380 converts the output matrix 371 into the output set 381. In the simple example, the output set is generated with elements having values corresponding to whichever index positions of the output matrix have a bit value (e.g., a binary 1). Thus, in the simple example, the output matrix [0 1 1 1] is converted into the output set {1, 2, 3}.

The method 200 be repeated for a different input set and different specific set operation. For instance, suppose that the set operation "query whether the set has a 1" is to be applied to the input set {1, 2, 3}. Here, the first matrix would be obtained by representing the input set {1, 2, 3} as matrix [0 1 1 1]. The general matrix operation corresponding to the general set operation of "query" is a bit-wise logical AND. Furthermore, the operand is "1" and thus the second matrix is [0 1 0 0]. Bit-wise logical AND'ing the two matrices [0 1 1 1] and [0 1 0 0] result in the output matrix [0 1 0 0]. This output matrix is interpreted mean that, "Yes, there is a 1 in the input set" since there is a binary 1 at the index position corresponding to the value of 1 (in the first index position).

The principles just described can be applied for increasing complexity of sets, and for cases in which there are multiple (and potentially huge quantities of) operands. Take the case where the input set is {0, 4, 5, 9, 15} which is represented in a first sparse matrix [1 0 0 0 1 1 0 0 0 1 0 0 0 0 0 1]. Now suppose the set operation is to insert 10, 13 and 14 into the input set. The second matrix would be [0 0 0 0 0 0 0 0 0 0 1 0 0 1 1 0] with a binary 1 at index positions 10, 13 and 14. The corresponding general matrix operation for an insert set operation is a bit-wise logical OR. Thus, the multi-core processing unit would bit-wise logical OR the two matrices [1 0 0 0 1 1 0 0 0 1 0 0 0 0 0 1] and [0 0 0 0 0 0 0 0 0 0 1 0 0 1 1 0], resulting in an output matrix [1 0 0 0 1 1 0 0 0 1 1 0 0 1 1 1], which converts to an output set of {0, 4, 5, 9, 10, 13, 14, 15}. Similarly, to query whether there is a 6 and 10 in this output set, the input set {0, 4, 5, 9, 10, 13, 14, 15} would be represented as the first matrix [1 0 0 0 1 1 0 0 0 1 1 0 0 1 1 1] and logically AND'ed with the second matrix [0 0 0 0 0 0 1 0 0 0 1 0 0 0 0 0] to obtain the output matrix [0 0 0 0 0 0 0 0 0 0 1 0 0 0 0 0], to conclude that there is no 6 in the input set, but there is a 10 in the input set.

Now, consider that the input set could have values that map to any one of 2^32 values. In such cases, the input set is converted into a one-dimensional sparse matrix, and the operand is also converted into a one-dimensional sparse matrix. For insert operations, these two sparse matrices are bit-wise logically OR'ed, and for query operations, these two sparse matrices are bit-wise logically AND'ed. If the input set could have values that map to any one of 2^64 values, the input set and operand sets are converted into a two-dimensional sparse matrix of dimensions 2^32 by 2^32. One can then quickly insert or query for multiple values into even such a large set with one fast operation using the multi-core processing unit, especially if using a graphics processing unit.

In the above examples, the input set was a set of values. In this case, the first matrix collection was just a first matrix, and the second matrix collection representing the operands was just a second matrix. Furthermore, an insert operation was performed by bit-wise logically OR'ing the first and second matrices, and a query operation was performed by bit-wise logically AND'ing the first and second matrices. However, the input set could instead be a collection of key-value pairs. In that case, the first matrix collection includes a first matrix that represents the keys, and another matrix (which we will call a "third matrix") that represents the corresponding values. Furthermore, the second matrix collection includes the second matrix as well as, depending on the general set operation, another matrix (which we will call a "fourth matrix").

For illustrative purpose only, we will use the input set {b=5, d=6}, which will be referred to as the "simple key-value example" herein. Here, the first matrix has a binary 1 at each position for which there is a corresponding key. For instance, suppose that the zero'th index position is a binary 1 if and only if the input set has an element having key "a", a binary 1 at the first position if and only if the input set has an element having key "b", a binary 1 at the second position if and only if the input set has an element having key "c", and so forth. Accordingly, in this case, the first matrix collection includes a first matrix that represents keys, where the first matrix has a bit value (e.g., a binary 1) corresponding to places in which there are keys in the input set. Here, the keys in the input set {b=5, d=6} are "b" corresponding to an index position of 1, and "d" corresponding to an index position of 3. Thus, the first matrix would be [0 1 0 1]. Furthermore, the first matrix collection would also include a third matrix representing corresponding values.

The third matrix includes the value at each position that has an index of the same position as the corresponding key for that value. Thus, in this simple example of the input set being {b=5, d=6}, the third matrix would be [0 5 0 6]. Accordingly, referring to FIG. 3, in this example, the first matrix collection 311 includes first matrix [0 1 0 1] representing keys and the third matrix [0 5 0 6] representing values.

In this simple key-value example, suppose that the set operation is a write operation to write values corresponding to one or more keys to the input set. In this case, the second matrix of the second matrix collection includes a bit value at each position that corresponds to any of the one or more keys to be written, and a fourth matrix representing corresponding values of the one or more keys, where the fourth matrix includes the value at each position that has an index that is of the same position as the corresponding key for the value.

As an illustrative example, suppose that the simple key-value example is expanded to show what would happen if there is a write command to write a=4, and c=7 to the input set. Here, two new key-value pairs (a=4 and c=7) are added to the input set. The second matrix becomes [1 0 1 0] since a and c are the operands of the write operation. Furthermore, the fourth matrix becomes [4 0 7 0], which represents the values of "a" and "c" to be written. The matrix operation comprises a bit-wise logical OR of the first matrix [0 1 0 1] and the second matrix [1 0 1 0] to obtain a first intermediary matrix [1 1 1 1]. This first intermediary matrix represents that the output set will includes keys for a, b, c and d. Furthermore, the matrix operation also includes an addition of the third matrix [0 5 0 6] and the fourth matrix [4 0 7 0] to obtain the second intermediate matrix [4 5 7 6]. From this, the output set can be populated as {a=4, b=5, c=7, d=6}. In other words, the output set is represented as having keys corresponding to the binary 1 positions of the first intermediate matrix [1 1 1 1] (or a, b, c and d), and for each of the keys, the value of the key is represented as corresponding to the index within the second intermediary matrix that is at a same position as the corresponding key in the first intermediary matrix.

Continuing the illustrative example, suppose that the next set operation is to read a and b from the input set {a=4, b=5, c=7, d=6}. Here, the first matrix [1 1 1 1] represents the keys, and the third matrix [4 5 7 6] represents the corresponding values. The operands are a and b, and thus the second matrix is [1 1 0 0] with the binary 1 at positions corresponding to the keys to be read. The matrix operation would include a bit-wise logical AND of the first matrix and the second matrix to generate a first intermediate matrix—which in this case would be [1 1 0 0]. In addition, the third matrix (e.g., [4 5 7 6] is multiplied by the first matrix [1 1 1 1] to obtain a second intermediary matrix (which in this case would be [4 5 0 0]. The output set is then obtained by two matrices, a keys matrix and a value matrix. The key matrix is the first intermediate matrix [1 1 0 0] and represents the keys (a and b) of the key-value pairs being read. The value matrix is the second intermediate matrix [4 5 0 0] which represents the corresponding values of the keys being read. Thus, the read operation would read two key-value pairs including a=4 and b=5.

Continuing the illustrative example, suppose now that the a=4 and b=5 key-value pairs are to be deleted from the input set. Here, the first matrix would again include a bit value set (e.g., a binary 1) at each position that corresponds to a key of the input set. Since keys a, b, c and d all exist within key-value pairs of the input set {a=4, b=5, c=7, d=6}, the first matrix would again be [1 1 1 1]. The second matrix would include a bit value (e.g., a binary 1) at each position corresponding to a key to be deleted. In this case, since a=4 and b=5 are to be deleted, the second matrix would be [1 1 0 0]. The bit-wise complement of the second matrix is found [0 0 1 1], and the bit-wise logical AND is applied to the first matrix and the complement of the second matrix to obtain [0 0 1 1]. This is the first intermediate matrix that represent the keys in the corresponding output set. Then, a multiplication of the third matrix [4 5 7 6] is applied to the complement of the second matrix [0 0 1 1] so as to obtain the second intermediate matrix [0 0 7 6] that represents the values of the output set. Accordingly, the output set is derived from the first intermediate matrix [0 0 1 1] representing keys, and the second intermediate matrix [0 0 7 6] representing values, so that the output set is {c=7, d=6}. Note that a=4 and b=5 have been deleted.

Now, consider that the input set could have values that map to any one of 2^32 key-value pairs. In such cases, the input set is converted into two one-dimensional sparse matrices (one for the keys and one for the values), and the operand is also converted into one or two one-dimensional sparse matrices. The principles just described can be extended to operations to insert and query several items within such a large input set. If the input set could have values that map to any one of 2^64 values, the input set and operand sets are converted into a two-dimensional sparse matrix of dimensions 2^32 by 2^32. One can then quickly insert or query for multiple values into even such a large set with one fast operation using the multi-core processing unit, especially if using a graphics processing unit.

Accordingly, the principles described herein make beneficial use of a multi-core processing unit (such as a graphics processing unit) to perform very fast set operations on large input sets. The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that duplicates a result of a set operation by performing one or more matrix operations offered by a multi-core processing unit instead of by performing the set operation, said computing system comprising:
   one or more processors; and
   one or more hardware storage devices that store instructions that are executable by the one or more processors to cause the computing system to:
   represent an input as a first matrix;
   identify an operand associated with the set operation whose result is to be duplicated;
   represent the operand using a second matrix;
   identify the one or more matrix operations offered by the multi-core processing unit;

generate an output matrix by using the multi-core processing unit to perform the one or more matrix operations on the first and second matrices; and represent the output matrix as an output set that represents the result that would otherwise have been generated had the set operation been performed on the input set.

2. The computing system of claim 1, wherein the set operation is one of an insert operation, a query operation, or a write operation.

3. The computing system of claim 1, wherein the input set includes a set of key-value pairs.

4. The computing system of claim 1, wherein the operand identifies what element is to be operated on in accordance with the set operation.

5. The computing system of claim 1, wherein the operand is represented in a form of a matrix collection that includes the second matrix.

6. The computing system of claim 1, wherein the multi-core processing unit is a graphics processing unit.

7. One or more hardware storage devices that store instructions that are executable by one or more processors to cause the one or more processors to:

represent an input as a first matrix;

identify an operand associated with a set operation whose result is to be duplicated;

represent the operand using a second matrix;

identify one or more matrix operations offered by a multi-core processing unit;

generate an output matrix by using the multi-core processing unit to perform the one or more matrix operations on the first and second matrices; and represent the output matrix as an output set that represents the result that would otherwise have been generated had the set operation been performed on the input set.

8. The one or more hardware storage devices of claim 7, wherein the set operation is one of an insert operation, a query operation, or a write operation.

9. The one or more hardware storage devices of claim 7, wherein the input set includes a set of key-value pairs.

10. The one or more hardware storage devices of claim 7, wherein the operand identifies what element is to be operated on in accordance with the set operation.

11. The one or more hardware storage devices of claim 7, wherein the operand is represented in a form of a matrix collection that includes the second matrix.

12. The one or more hardware storage devices of claim 7, wherein the multi-core processing unit is a graphics processing unit.

13. A method for duplicating a result of a set operation by performing one or more matrix operations offered by a multi-core processing unit instead of by performing the set operation, the method comprising:

representing an input as a first matrix;

identifying an operand associated with the set operation whose result is to be duplicated;

representing the operand using a second matrix;

identifying the one or more matrix operations offered by the multi-core processing unit;

generating an output matrix by using the multi-core processing unit to perform the one or more matrix operations on the first and second matrices; and representing the output matrix as an output set that represents the result that would otherwise have been generated had the set operation been performed on the input set.

14. The method of claim 13, wherein the set operation is one of an insert operation, a query operation, or a write operation.

15. The method of claim 13, wherein the input set includes a set of key-value pairs.

16. The method of claim 13, wherein the operand identifies what element is to be operated on in accordance with the set operation.

17. The method of claim 13, wherein the operand is represented in a form of a matrix collection that includes the second matrix.

18. The method of claim 13, wherein the multi-core processing unit is a graphics processing unit.

19. The method of claim 13, wherein the set operation is a bitwise logical AND operation.

20. The method of claim 13, wherein the set operation is a bitwise logical OR operation.

* * * * *